Figure 5:
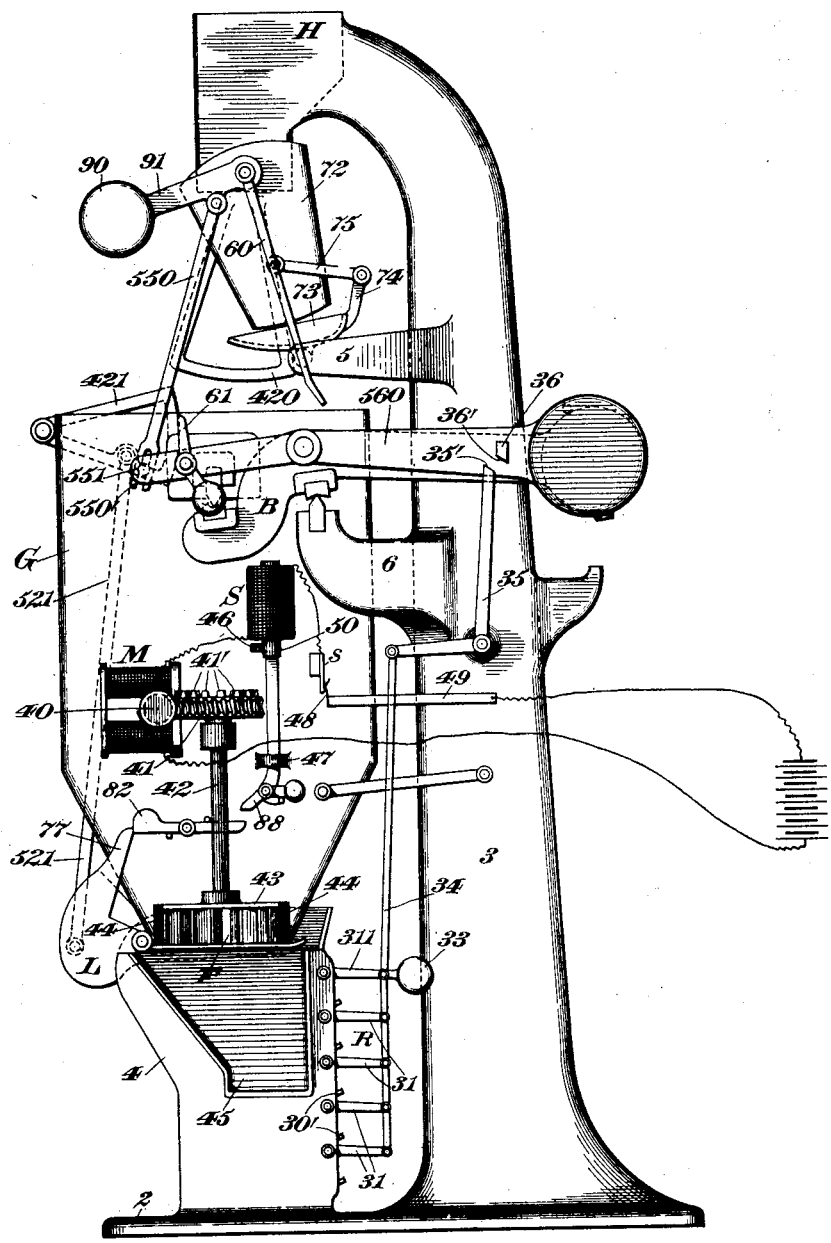

(No Model.)  F. H. RICHARDS.  4 Sheets—Sheet 1.
WEIGHING MACHINE.
No. 589,278.  Patented Aug. 31, 1897.
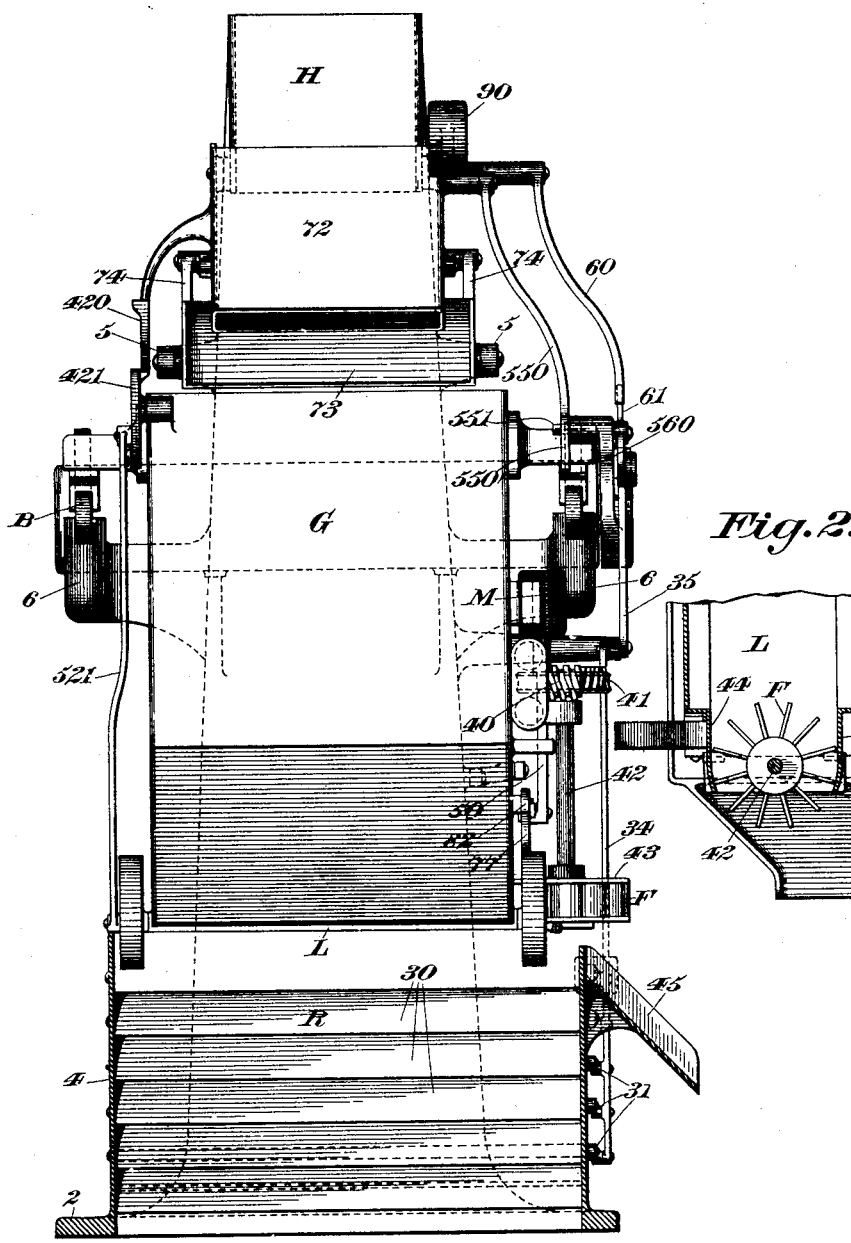
Witnesses;
O. W. Smith
Fred J. Dole.
Inventor;
F. H. Richards.

(No Model.)
4 Sheets—Sheet 2.
F. H. RICHARDS.
WEIGHING MACHINE.
No. 589,278.
Patented Aug. 31, 1897.
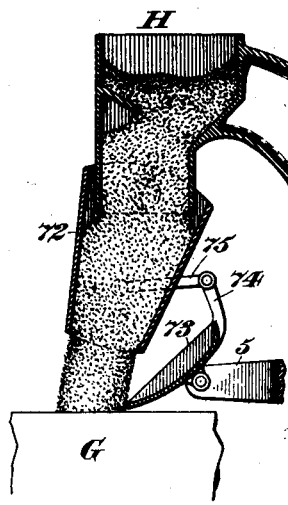
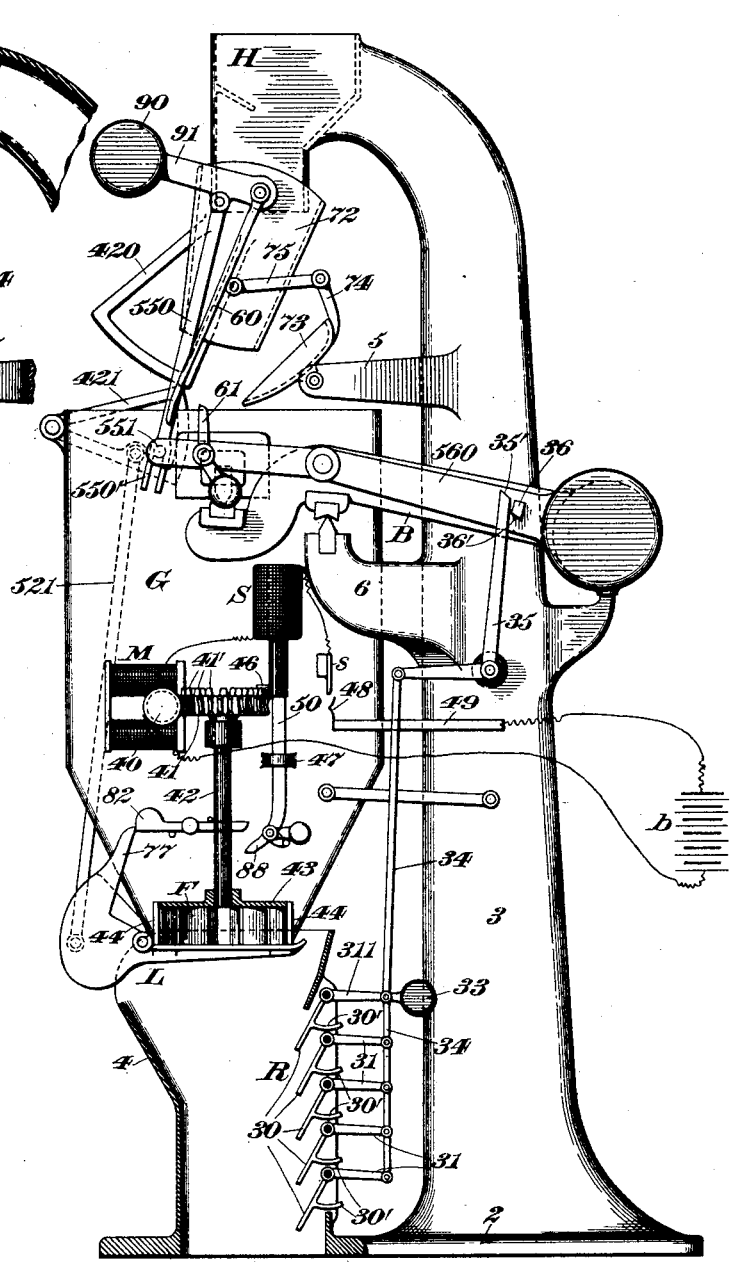
Witnesses:
C. W. Smith
Fred. J. Dole.
Inventor:
F. H. Richards

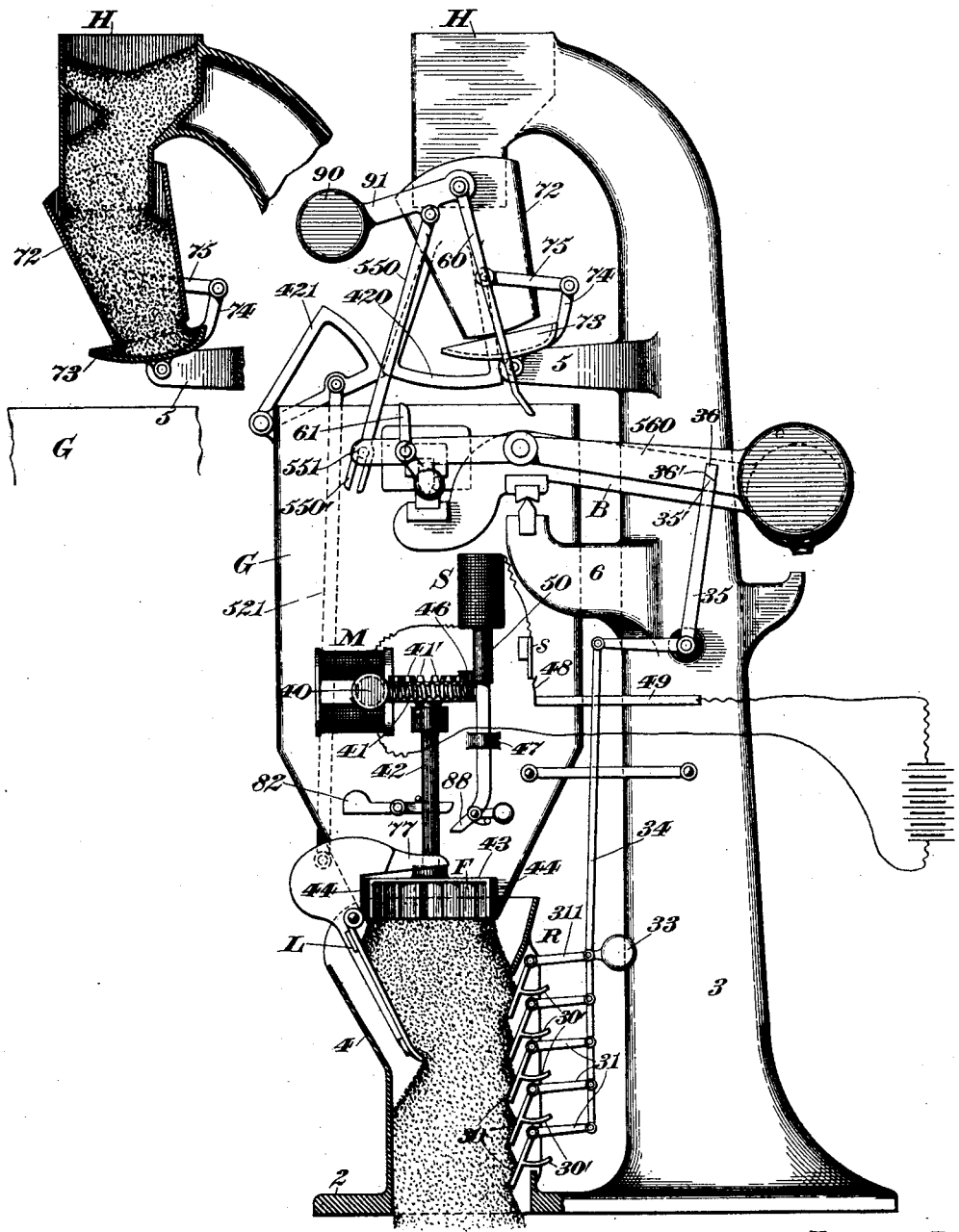

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,278, dated August 31, 1897.

Application filed April 3, 1897. Serial No. 630,508. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines; and it has for its main object the provision of an improved machine of this class by means of which predetermined quantities of material of a granular or other character may be weighed accurately and rapidly.

In the drawings my present improvements are shown in connection with and they are especially applicable to a weighing-machine of the type in which an overload is supplied to the load-receiver for the purpose of overpoising the same, and a portion of the material is then removed to reduce the contents to a true load and permit the receiver to rise to a poising position.

The improvements illustrated embody as a part thereof improved load-reducing means whereby the overload is removed from the load-receiver, the means shown for accomplishing this result being a rotary feed-wheel preferably driven by an electric motor and governed by a circuit-controller operative with the weighing mechanism. As to this feature of my invention it is not intended to cover, broadly, a power-feeder for feeding material from the load-receiver, as such a construction is shown in my prior applications, Serial No. 621,044, filed January 28, 1897, and Serial No. 624,417, filed February 20, 1897; but it is intended to cover a feed-wheel having its plane of rotation transverse to the path of discharge of the load delivered from the load-receiver and especially a feed-wheel having its axis of rotation substantially perpendicular to the closer.

Another feature of my invention is the provision of an electrically-operated latch-tripper preferably carried by the load-receiver and adapted to be operated by a gravitative core of a solenoid, also controlled by the weighing mechanism, this solenoid and the motor hereinbefore referred to being preferably included in the same circuit and both governed by a circuit-controller on the load-receiver.

In connection with the valve for supplying a stream of material to the load-receiver and with the actuator for opening the same I employ in the present case a regulator having a plurality of superposed overlapping blades in position to receive the pressure of a large portion of the material discharged from the load-receiver and connected with a suitable stop or valve-opening-movement limiter, by means of which the valve-actuating movement of the valve-opening actuator may be blocked, while the discharged load passes by and bears against the blades of the regulator.

Still another feature of this invention is the employment of improved valve mechanism in which a main valve coöperates with a cut-off valve having its axis of movement below its stream-supporting face, the main valve being preferably a tubular swinging member, the mouth of which will be closed by the cut-off valve when the two stream-controllers are in position to shut off entirely the flow of material to the load-receiver.

In the drawings accompanying and forming part of this specification, Figure 1 is a front elevation, partially in section, of a weighing-machine embodying my present improvements. Fig. 2 is a detail sectional plan of a portion of the mechanism shown at the lower right-hand side in Fig. 1 and illustrates the feeder or load-reducing feed-wheel for removing material from the load-receiver and an auxiliary chute through which such material is discharged. Fig. 3 is a side elevation, partially in section, of the machine, showing the valves open and in position to supply material to the bucket. Fig. 4 is a vertical sectional detail of the stream-supplying means and the valve mechanism shown in Fig. 3 and in a similar position. Fig. 5 is a side elevation of the machine, showing the valves closed and the load-receiver ready to be discharged. Fig. 6 is a side elevation, partially in section, illustrating the release of the latch by an electrically-operated latch-tripper and also shows the discharge of the load; and Fig. 7 is a vertical sectional detail of the stream-supplying means and the valve mechanism in the positions illustrated in Fig. 6.

Similar characters designate like parts in all the figures of the drawings.

The several operative parts of my improved weighing-machine may be carried by any suitable framework. That illustrated comprises a base 2, from which rises a standard 3, at the rear end thereof, an open discharge-chute or regulating-chamber being shown at 4 at the front of said base. The standard 3 has a curved upper end or neck, forming an overhanging portion which carries the usual hopper H for supplying material to the load-receiver.

The valve mechanism which I prefer to employ comprises in this case a main valve and a cut-off valve disposed beneath the main valve and adapted to close under the same, the main valve being in this instance a tubular member (designated by 72) pivoted to the hopper H. The cut-off valve is in this case in the nature of a rocking valve-pan (designated by 73) carried by suitable supporting means—such, for example, as brackets 5 5, projecting from the forward side of the standard 3. It will be noticed that this valve-pan is in the nature of a rocking valve and has its axis of movement below its stream-supporting face, so that the valve will not oscillate about a point therein, but will have a rocking movement bodily about a point outside and below the valve itself.

The cut-off valve 73 has in this case a pair of arms 74, and to these arms are pivoted links 75 in such a manner as to permit the cut-off valve to be opened and closed by the corresponding movements of the main valve 72. In this case the links are pivoted directly to the sides of said main valve. For the purpose of actuating these valves to open and close the same I may employ actuators similar to those shown in prior patents granted to me. The valve-closing actuator in this case is in the form of a rock-arm 91, fixed to the main valve 72, and carries at its forward end a valve-closing weight 90. It will be noticed by reference to Fig. 3 that when in its normal position, with the main valve wide open, this valve-closing actuator is so disposed as to have a minimum efficiency, but that during the closing movement of the valve the efficiency of this actuator will increase, owing to the movement of the weight 90 toward a horizontal line through an arc of increasing force. It will be obvious that the closing of the valve should take place only during the descent of the load-receiver after a sufficient quantity of material has been supplied thereto to permit the same to descend. Hence I have shown between this valve-closing actuator and the beam mechanism the usual thrust-rod 550, this thrust-rod being preferably connected to the arm 91 of the valve mechanism and having its lower end bifurcated, as shown at 550', and in position to straddle a pin 551 on the forward end of a counterweighted lever, which constitutes the valve-opening actuator. This valve-opening actuator is designated by 560 and is pivoted on the beam mechanism of the machine in such a manner as to open the main valve 72 and hence the cut-off valve 73 when released by the connections controlled by the regulator.

For the purpose of holding the main valve and the cut-off valve in fixed positions during the drip period when the last part of the load is supplied to the load-receiver I may make use of the usual drip-lever 60 and a by-pass stop 61 on the beam mechanism for holding said drip-lever and thereby preventing the closure of the valves until the upper end of the by-pass has passed below the lower end of the drip-lever. In this case said by-pass stop is carried on the forward end of the counterweighted lever 560.

The beam mechanism for my improved machine is designated in a general way by B and comprises a pair of beam-arms pivoted in the usual manner on knife-edge pivots, carried in this case on a pair of brackets 6 6, projecting from the forward side of the standard 3 below the arms 5 5, and the load-receiver, which is indicated by G, is also pivoted in the usual manner on knife-edges supported on the forward ends of the beam-arms of the beam mechanism.

The load-receiver G is of the usual type, having a discharge-opening at the lower end thereof, this opening being controlled by a counterweighted closer, (indicated by L.)

Between the closer and the main valve I may interpose the usual interlocking stops, the closer-opening-movement limiter being indicated at 420 in fixed relation with the valve 72, while the valve-opening-movement limiter is represented by 421 and is in the form of a rocker mounted for oscillation on the upper side of the bucket and connected with the closer L by means of a rod 521.

A latch of any suitable construction may be employed for holding the shiftable member of the load-receiving mechanism against movement while the charge in the load-receiver is being made up, this latch being indicated at 82 and having its forward end so shaped as to coöperate with a stop-arm 77, projecting from the closer L. This latch is intended to be tripped in this case by an electrically-operated latch-tripper operative on the ascent of the bucket after it has been overloaded, and in this case the latch-tripper, which is indicated at 88, is carried by the core 50 of a solenoid (designated in a general way by S) supported on the side of the load-receiver. This solenoid is included in a circuit from any suitable source of power (indicated at $b$) and is governed by an automatic circuit-controller preferably movable with the load-receiver, as shown at $s$, this circuit-controller being intended to close the circuit when the load-receiver is overloaded and descends below a poising position and to break the circuit and thereby release the core of the solenoid when the load-receiver rises to a poising position after a portion of the material has been removed therefrom.

For the purpose of removing the surplus material from the bucket I may make use of any suitable load-reducing means, but in this case I prefer to employ a rotary load-reducing feed-wheel controlled by an electric motor in the circuit with the solenoid. This motor is indicated by M and is carried advantageously on the side of the load-receiver, so as to move with the latter during the making up of a load.

The feeder or feed-wheel is indicated at F and is also preferably mounted on the side of the load-receiver, it being driven from the motor M by suitable driving connections. In the present instance the armature-shaft of the motor M carries at the outer end thereof a worm 40, which meshes with the teeth of a worm-wheel 41, carried on the upper end of a shaft 42, which is supported by suitable bearings on the side of the load-receiver and has secured to the lower end thereof the feed-wheel F. This feed-wheel is preferably disposed partly within and partly without the load-receiver, and in the construction shown in the drawings it is supported on the outside of the load-receiver and projects into the same a sufficient distance to enable the arms or blades of the feeder to dip into the material in the load-receiver and remove the same from the bucket.

By referring to Figs. 1 and 2 it will be seen that a casing is provided for covering the top of the feed-wheel and inclosing the periphery thereof, except at the discharge side of the wheel, the upper part of the casing being designated by 43 and the sides by 44. Both the cover and the sides of this casing are formed in this instance as a part of the bucket, and the feed-wheel is so disposed therein as to have its under side in juxtaposition with the inner side of the closer L, so that the closer forms a floor for the feed-wheel and assures the removal of the excess in the load-receiver from one side only of said wheel.

I have illustrated at 45 at one side of the chamber 4 on the base of the machine a discharge-chute through which the material removed from the load-receiver may be delivered into any suitable receptacle. (Not shown.)

It will be obvious that in order to stop the operation of the reducing means or feed-wheel at the proper point some suitable means should be employed for positively checking the rotation of the feeder, and for this purpose I prefer to make use of electrically-operated feeder-stopping means in the circuit with the motor and preferably controlled by the solenoid S. This feeder-stopping means is shown as a lug or stop 46, integral with the core 50 of the solenoid and projecting laterally therefrom. The solenoid is disposed in a vertical position and is so located relatively to the worm-gear 41 that on the breaking of the circuit controlling the solenoid the core 50 may drop by its own gravity and the stop 46 engage one of a circuit of stops or teeth 41', rising from the upper side of the worm-gear 41.

It will be noticed that the lower end of the core of the solenoid is rectangular in cross-section for a considerable portion of its length and that the load-receiver has on the side thereof an apertured ear or guide 47, through a rectangular opening in which the lower end of the core passes and by which it is guided so as to prevent turning thereof.

As the feeder-stopping means is controlled by the solenoid S, and as the motor and the solenoid are in series from the source of energy $b$, it will be apparent that while the motor is energized the stop 46 will be held up out of engagement with the teeth 41' on the worm-gear 41 and that the latter will be free to rotate and thereby operate the feed-wheel F. The circuit to this motor and to the solenoid is, as before stated, governed by the circuit-controller $s$, this circuit-controller being in the nature of a contact carried by the load-receiver and in position to make and break the circuit, with a yielding contact 48, carried at the forward end of a contact-arm 49, secured to the upright 3. The circuit-controller $s$ is normally out of engagement with the contact 48 and the circuit is open, the circuit-controller being intended to close the circuit on the overloading of the bucket and its descent below a poising position to thereby start the motor and rotate the feed-wheel to reduce the contents of the load-receiver to a true load, it being clear that after such reduction has been effected the load-receiver will rise, the organization of the parts being such that on the ascent of the load-receiver to a poising position the circuit will be broken, the motor stopped, the core of the solenoid released, and the stop 46 brought into operation to check the rotation of the feed-wheel.

For the purpose of regulating the valve-opening movement of the valve-opening actuator 560 I have shown in the drawings a regulator (designated in a general way by R) comprising a plurality of superposed overlapping regulator-blades 30, which are preferably oscillatory and connected for movement in unison. By referring to Fig. 1 it will be seen that each of these blades is in the nature of a long and comparatively wide strip supported for oscillation between the ends of the regulating-chamber 4, the rear of this chamber being open and the regulator-blades serving to close the same. Each of the regulator-blades has secured thereto a rock-arm 31, these arms being connected to the rod 34, so that all of the blades will have simultaneous rocking movements. As before stated, these blades overlap, as will be seen by referring to Figs. 3 and 6, and they are disposed at such an angle to a perpendicular line as to prevent almost entirely the escape of material from the rear of the regulating-chamber; but in order to obviate the possibility of such an occurrence I prefer to make use of guard-plates, such as 30', secured to the regulator-blades in such positions as to close the spaces between adjacent regulator-blades. Each of these guard-plates is preferably concentric to the axis of movement of its regulator-blade and lies close to the upper edge of the blade immediately beneath it, but in such a position that it will not interfere with the operation of the latter.

The regulator R is preferably counterweighted, so as to normally return to its non-regulating position, this counterweight being shown at 33. Moreover, this regulator is intended to prevent the valve-opening movement of the valve-opening actuator 560 until substantially all of the material discharged from the load-receiver on the opening of the closer or load-discharger L has passed by the regulator. For the purpose of blocking this movement of the actuator 560 a connecting-rod 34, pivoted to the rock-arms of the regulator, may be operatively connected with a stop or valve-opening-movement limiter, so positioned as to coöperate with the counterweighted lever 560. This valve-opening-movement limiter is in the present case in the form of an angle-lever 35, carried for oscillation on the side of the standard 3 and having the upper end of its free arm in position to coöperate with a suitable part of such lever 560. In this instance a stop 36, having a cam-face 36', is carried by the lever 560, and the upper end of the free arm of the angle-lever 35 has a corresponding cam-face 35', adapted to coöperate with the face 36' of the stop 36, the parts being so organized that when a load is discharged the stop-face 35' will be carried under the stop 36, as shown in Fig. 6, and will prevent oscillation of the counterweighted lever 560 until substantially all of the discharged load has passed through the regulating-chamber 4. The stop-faces 35' and 36' are disposed at such an angle that the force exerted against the regulator-blade 30 by the material will be sufficient to hold the stop-face 35' beneath the stop 36, while permitting the counterweighted lever to become effective to force the free arm of the angle-lever 35 away from the stop 36 when all of the material shall have passed through the regulating-chamber.

The operation of a machine constructed in accordance with my present improvements is as follows: When the parts are in their normal positions, (shown in Fig. 3,) both the valves will be wide open, the circuit from the source of energy b will be broken, the motor idle, the closer shut, and the regulator in its non-regulating position with the stop 35' out of engagement with the stop 36. After the major portion of the material has been supplied to the bucket the two valves 72 and 73 will be held by the drip-lever 60 and the stop 61 in position to deliver a drip-stream of considerable size to the load-receiver until the latter shall have passed below the poising-line and an overload has been delivered thereto, whereupon the circuit-controller will make contact with the contact-piece 48 and close the circuit to the solenoid and the motor, thereby causing the operation of the motor and the rotation of the feed-wheel to reduce the overload in the load-receiver to a true load and at the same time withdrawing the stop 46 on the core 50 from engagement with the stops or teeth on the worm-gear 41. As fast as material is removed from the load-receiver by the feed-wheel the load-receiver will rise, and when it reaches the poising-line in its ascent the circuit will be broken by the circuit-controller s, whereupon the core of the solenoid will drop by gravity and the stop 46 thereof engage a stop on the worm-gear, and the latch-tripper will strike the latch a sharp blow and release the closer to thereby discharge the load. The two valves having been closed previously by the counterweight 90 on the release of the latch-tripper from the stop 61 during the descent of the bucket the stop 420 will be in position to permit the closer to open, as shown in Fig. 6, and discharge the load. As soon as the material passes out from the load-receiver it enters the regulating-chamber 4, and by its pressure against the regulating-blades 30 forces the latter and the counterweighted lever 33 from the position shown in Fig. 3 to that illustrated in Fig. 6, at the same time carrying the stop-face 35' of the valve-opening-movement limiter 35 under the stop-face 36' of the stop 36 on the counterweighted lever 560 and preventing the valve-actuating movement of the latter. As soon as substantially all of the discharged load passes by the regulator, the force of the counterweighted levers 560 and 33 becomes effective to thrust the free arm of the angle-lever 35 toward the left, as shown in Fig. 3, and restore the regulator to its normal non-regulating position, it being understood, of course, that the closer will have been returned to its normal shut position on the discharge of the contents of the load-receiver. The oscillation of the lever 560 will of course at the same time force up the thrust-rod 550 and carry the valve 72 and thereby the valve 73 to a wide-open position.

Having described my invention, I claim—

1. The combination, in a weighing-machine, of a member shiftable for discharging the load; a latch for said shiftable member; an electric circuit; an automatic circuit-controller carried by a movable member of the weighing mechanism; and an electrically-operated striking latch-tripper having a latch-tripping movement independent of the movements of the weighing mechanism and controlled by said circuit and adapted to release the latch by a blow.

2. The combination, in a weighing-machine, of a member shiftable for discharging the load; a latch for said shiftable member; an electric circuit; an automatic circuit-controller carried by a movable member of the weighing mechanism; and a striking latch-tripping solenoid mounted on a movable member of the weighing mechanism and having a latch-tripping movement independent of the movement of such movable member and controlled by said circuit and adapted to release the latch by a blow.

3. The combination, in a weighing-machine, of a load-receiver; a closer for the load-receiver; a closer-latch; an electric circuit; an automatic circuit-controller carried by a movable member of the weighing mechanism; and a striking latch-tripping solenoid carried by said load-receiver and having a latch-tripping movement independent of the movement of the load-receiver and controlled by said circuit and adapted to release the latch by a blow.

4. The combination, in a weighing-machine, of a member shiftable for discharging the load; a latch for said shiftable member; a normally-closed electric circuit; an automatic circuit-breaker carried by a movable member of the weighing mechanism and controlling said circuit and operative at a determined point in the movement of such movable member; and a solenoid in said circuit and carrying a core having a gravitative latch-tripping movement independent of the movements of the weighing mechanism and adapted to release the latch by a blow on the breaking of the circuit.

5. The combination, in a weighing-machine, of a member shiftable for discharging the load; a latch for said shiftable member; an electric circuit; an automatic electric-circuit controller carried by a movable member of the weighing mechanism; a solenoid in said circuit and mounted on a movable member of the weighing mechanism; and a striking bypass latch-tripper carried by the core of the solenoid and having a latch-tripping movement independent of the movements of the weighing mechanism and controlled by said circuit and adapted to release the latch by a blow.

6. The combination, in a weighing mechanism, of a load-receiver; stream-supplying means therefor; and a rotary feed-wheel rotatable in a plane transverse to the path of discharge of the load for removing material from the load-receiver.

7. The combination, in a weighing mechanism, of a load-receiver; overloading means for supplying an overload to said load-receiver; and a rotary load-reducing wheel rotatable in a plane transverse to the path of discharge of the load.

8. The combination, in a weighing mechanism, of a load-receiver; overloading means for supplying an overload to said load-receiver; and a rotary load-reducing wheel carried by said load-receiver and rotatable in a plane transverse to the path of discharge of the load.

9. The combination, in a weighing mechanism, of a load-receiver; overloading means for supplying an overload to said load-receiver; and a rotary load-reducing wheel disposed partly within and partly without the load-receiver and rotatable in a plane transverse to the path of discharge of the load.

10. The combination, in a weighing mechanism, of a load-receiver; overloading means for supplying an overload to said load-receiver; and a rotary load-reducing wheel supported on the outside of the load-receiver and projecting into the same and rotatable in a plane transverse to the path of discharge of the load.

11. The combination, in a weighing mechanism, of a load-receiver; a closer for the load-receiver; stream-supplying means; and a rotary feed-wheel having one of its sides in juxtaposition with and its axis of rotation substantially perpendicular to the inner side of the closer.

12. The combination, in a weighing mechanism, of a load-receiver; a closer for the load-receiver; stream-supplying means; a rotary horizontal feed-wheel disposed partly within and partly without the load-receiver and having its under side in juxtaposition with and its axis of rotation substantially perpendicular to the inner side of the closer; and a casing for said feed-wheel.

13. The combination, in a weighing mechanism, of a load-receiver; a closer for the load-receiver; stream-supplying means; a rotary horizontal feed-wheel supported on the outside of the load-receiver and projecting into the same and having its under side in juxtaposition with and its axis of rotation substantially perpendicular to the inner side of the closer; and a casing on the load-receiver for covering said feed-wheel.

14. The combination, in a weighing mechanism, of a load-receiver; stream-supplying means therefor; a rotary feed-wheel for removing material from the load-receiver; a stop member movable in unison with the feed-wheel; driving means for rotating said feed-wheel; and a stop movable into the path of said stop member for positively stopping the rotation of said feed-wheel.

15. The combination, in a weighing mechanism, of a load-receiver; stream-supplying means therefor; a feeder for removing material from the load-receiver; a stop member movable in unison with the feeder; driving means for actuating said feeder; an electric circuit; and an electrically-operated stop in said circuit and movable into the path of said stop member for positively stopping the operation of the feeder.

16. The combination, in a weighing mechanism, of a load-receiver; stream-supplying means therefor; a feeder for removing material from the load-receiver; a stop member movable in unison with the feeder; an electric circuit; an electric motor in said circuit, for operating the feeder; and an electrically-operated stop in said circuit and movable into the path of said stop member for positively stopping the operation of the feeder.

17. The combination, in a weighing mechanism, of a load-receiver; stream-supplying means therefor; a closer for the load-receiver; a closer-latch; a feeder for removing material from the load-receiver; an electric circuit; an electric motor in said circuit, for operating said feeder; a latch-tripping solenoid in said circuit; and feeder-stopping means controlled by the solenoid.

18. The combination, in a weighing mechanism, of a load-receiver; stream-supplying means therefor; a feeder for removing material from the load-receiver; an electric circuit; feeder-driving means; a solenoid in said circuit; and a stop carried by the core of the solenoid, for stopping the operation of the feeder.

19. The combination, in a weighing mechanism, of a load-receiver; stream-supplying means therefor; a feeder for removing material from the load-receiver; an electric circuit; an electric motor in said circuit, for operating the feeder; a solenoid in said circuit; feeder-stopping means controlled by the solenoid; and an automatic circuit-controller for alternately making and breaking said circuit.

20. The combination, in a weighing mechanism, of a load-receiver; overloading means for supplying an overload to the load-receiver; a load-reducing feeder; an electric circuit; an electric motor in said circuit, for operating the feeder; a solenoid in said circuit; feeder-stopping means controlled by the solenoid and operative on the breaking of the circuit; and an automatic circuit-controller operative for making said circuit on the overloading of the load-receiver, and for breaking said circuit on the ascent of the load-receiver to the poising position.

21. In a weighing mechanism, the combination, with stream-supplying means and with a load-receiver, of a load-discharger; and a regulator comprising a plurality of superposed overlapping regulator-blades.

22. In a weighing mechanism, the combination, with stream-supplying means and with a load-receiver, of a load-discharger; and a regulator comprising a plurality of superposed overlapping oscillatory regulator-blades.

23. In a weighing mechanism, the combination, with stream-supplying means and with a load-receiver, of a load-discharger; and a regulator comprising a plurality of superposed overlapping regulator-blades connected for movement in unison.

24. In a weighing mechanism, the combination, with stream-supplying means and with a load-receiver, of a load-discharger; and a regulator comprising a plurality of superposed overlapping regulator-blades and a plurality of guard-plates carried by said regulator-blades, respectively.

25. In a weighing mechanism, the combination, with stream-supplying means and with a load-receiver, of a load-discharger; and a regulator comprising a plurality of superposed overlapping regulator-blades and a plurality of guard-plates carried by said regulator-blades, respectively, and concentric with the respective axes of movement of the regulator-blades.

26. In a weighing mechanism, the combination, with a valve and with a load-receiver, of a valve-opening actuator; a load-discharger; a regulator comprising a plurality of regulator-blades connected for movement in unison; and a valve-opening-movement limiter movable with said regulator and operative for blocking the operation of the valve-opening actuator while the regulator is in its regulating position.

27. In a weighing mechanism, the combination, with a valve and with a load-receiver, of a valve-opening actuator; a load-discharger; a regulator comprising a plurality of regulator-blades connected for movement in unison; and a pair of stops one movable with the regulator and in position to engage the other and block the operation of the valve-opening actuator while the regulator is in its non-regulating position, and the second movable with the valve-opening actuator and in position and adapted to return the regulator to its normal position on the completion of the discharge of the load.

28. In a weighing mechanism, the combination, with a support, of stream-supplying means; a main valve; and a rocking cut-off valve pivoted between its ends on said support and having its axis of movement below its stream-supporting face when in its closed position.

29. In a weighing mechanism, the combination, with a support, of stream-supplying means; a tubular swinging main valve; and a rocking cut-off valve pivoted between its ends on said support and having its axis of movement below its stream-supporting face when in its closed position and adapted to close under said tubular valve.

30. In a weighing mechanism, the combination, with a support, of stream-supplying means; a main valve; a rocking cut-off valve pivoted between its ends on said support and having its axis of movement below its stream-supporting face when in its closed position; and connecting means between the main valve and the cut-off valve, for operating the latter from the former.

FRANCIS H. RICHARDS.

Witnesses:
S. W. POTTS,
F. N. CHASE.